March 15, 1966     O. W. SEPP, JR     3,240,451
RIBBON PARACHUTES

Filed April 7, 1964     3 Sheets-Sheet 1

INVENTOR.
OSCAR W. SEPP, JR.
BY
Burgess, Ryan & Hicks
ATTORNEYS

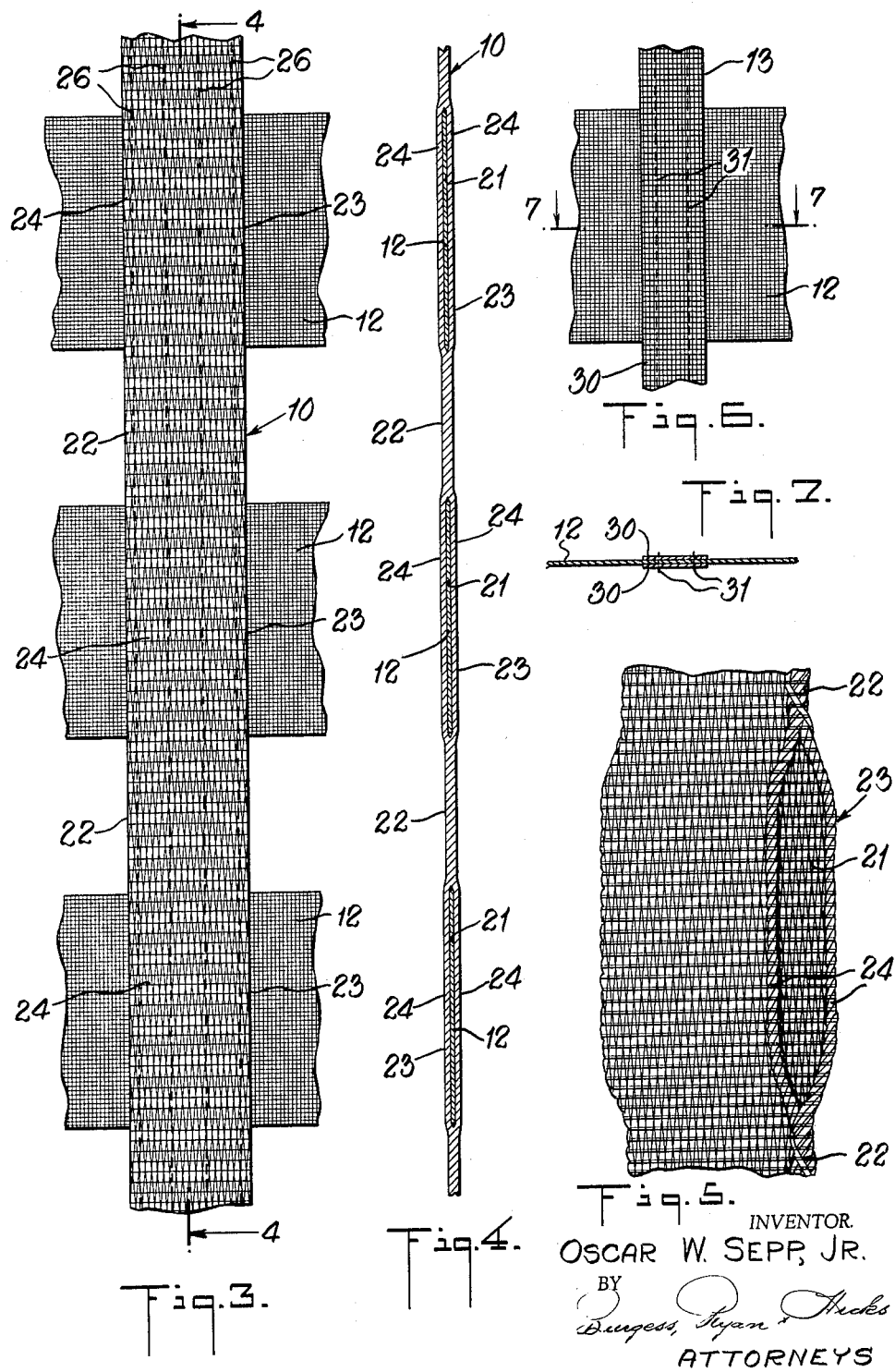

March 15, 1966     O. W. SEPP, JR     3,240,451
RIBBON PARACHUTES

Filed April 7, 1964     3 Sheets-Sheet 3

INVENTOR.
OSCAR W. SEPP, JR.
BY
ATTORNEYS

United States Patent Office 3,240,451
Patented Mar. 15, 1966

3,240,451
RIBBON PARACHUTES
Oscar W. Sepp, Jr., Merrick, N.Y., assignor to M. Steinthal & Co., Inc., New York, N.Y., a corporation of New York
Filed Apr. 7, 1964, Ser. No. 357,978
12 Claims. (Cl. 244—145)

The present invention relates to parachutes of the ribbon type, and the present application is a continuation-in-part of application Serial No. 194,129, filed May 11, 1962.

The conventional ribbon parachute canopy comprises in essence a plurality of spaced radial ribbons, a plurality of spaced horizontal ribbons, a horizontal vent band, a horizontal skirt band, sometimes a horizontal reinforcing band between said vent band and said skirt band, and a plurality of spaced vertical ribbons, the vertical ribbons in each canopy sector between each pair of successive radial ribbons being parallel. In such a conventional parachute, each horizontal ribbon extending around the entire circumference of the canopy comprises a series of separate sections, each section being approximately just long enough to span successive radial ribbons, and these sections overlapping in the regions of the radial ribbons and being stitched to these radial ribbons in these regions to form the joints between the radial ribbons and the horizontal ribbons. To assure the formation of strong joints between the radial ribbons and the overlapping horizontal ribbon sections, each radial ribbon comprises two parallel webs facing each other and sandwiching the overlapping ends of adjoining sections of the horizontal ribbons therebetween, and against one of the radial ribbon webs is a reinforcing ribbon extending therealong. The elements of this joint assembly are secured together by stitching. It is seen that at each of the joints between each horizontal ribbon and each radial ribbon are five plies of webbing, thus adding materially to the weight and volume of the parachute. Moreover, the joints with overlapping horizontal ribbon sections have inherent structural weaknesses.

Also, in conventional ribbon parachute canopies, the suspension lines are separate from the radial ribbons and are secured by joints to the skirt of the canopy at the regions where the radial ribbons terminate. This joint construction has inherent structural weakness and adds to the weight and volume of the parachute canopy.

One object of the present invention is to provide a new and improved ribbon parachute canopy, which is designed to withstand effectively high speed heavy duty, and which at the same time has its weight and volume substantially reduced in comparison with conventional ribbon parachute canopies of corresponding strength and capacity.

In accordance with certain features of the present invention, instead of providing each horizontal ribbon in sections for overlapping joint connections to the radial ribbons, each horizontal ribbon is in one continuous piece extending around the full circuit of the canopy, and each of the radial ribbons consists of a single webbing woven with slots spaced at repeated intervals and produced by dividing the webbing into two plies at spaced intervals to form said slots. The horizontal ribbon extends through the slots of the radial ribbon and may be secured to said radial ribbon at the slotted sections of said radial ribbon, desirably by stitching. This construction being free from overlapping end web sections at the regions where the horizontal ribbons connect into the radial ribbon, is strong and reduces the number of plies at these regions, thereby reducing the weight and volume of the canopy. Moreover, the connections formed at these regions are so strong, as to permit the elimination of the usual reinforcing webs along the radial ribbons, thereby further reducing the volume and weight of the parachute canopy.

As another feature of the present invention, the radial ribbons continue beyond the skirt of the canopy to form the suspension lines for the parachute. The extended portions of these ribbons may be unslotted and may be woven inot single ply webbing throughout their lengths. This construction adds to the strength of the parachute canopy and reduces its volume and weight.

As a further feature of the present invention, the radial ribbons may also be extended to form the vent lines for the canopy.

The distance between the radial ribbons must be predetermined within close tolerances in accordance with the design of the parachute and where the radial ribbons are secured to the vent band and the skirt band merely by stitching with or without reinforcing webbings, there may be errors in measurements, which will cause mislocation of the radial ribbons. Moreover, the use of reinforcing webbings at the juncture of these horizontal bands and the radial ribbons adds to the weight and volume of the parachute. The same may be true with respect to the connections between the intermediate horizontal reinforcing band or bands and the radial ribbons.

Another object of the present invention is to provide a new and improved ribbon parachute canopy designed to predetermine the location of the radial ribbons and at the same time designed to reduce its weight and volume with maximum strength and capacity.

For attaining the latter objectives, the horizontal skirt band and the horizontal vent band and desirably also the intermediate reinforcing band are each in one continuous piece extending around the full circuit of the canopy, and each consists of a single webbing woven with slots spaced at repeated intervals and produced by dividing the webbing into two plies at spaced intervals to form said slots. The radial ribbons extend through the slots of the horizontal bands and are desirably secured thereto by stitching.

Various other objects, features and advantages of the present invention are apparent from the following description and from the accompanying drawings, in which FIG. 1 is a perspective of an inflated cargo ribbon parachute embodying the present invention;

FIG. 3 is a plan view of a detail of the parachute canopy of the present invention along a section of a radial ribbon where a number of horizontal ribbons intersect said radial ribbon;

FIG. 4 is a longitudinal detail section of the parachute canopy taken along the lines 4—4 of FIG. 3;

FIG. 5 is a sectional perspective of part of the radial ribbon where a horizontal ribbon is adapted to be threaded through a slot thereof, the opposed plies of said slot being shown spread apart beyond the normal position assumed by said plies when a horizontal ribbon passes through said ribbon, to emphasize in the drawing the presence of the slot;

FIG. 6 is a plan view of a detail of the parachute canopy of the present invention along a section of a vertical ribbon where a horizontal ribbon intersects said vertical ribbon;

FIG. 7 is a detail section of the parachute canopy taken along the lines 7—7 of FIG. 6;

Figure 1:
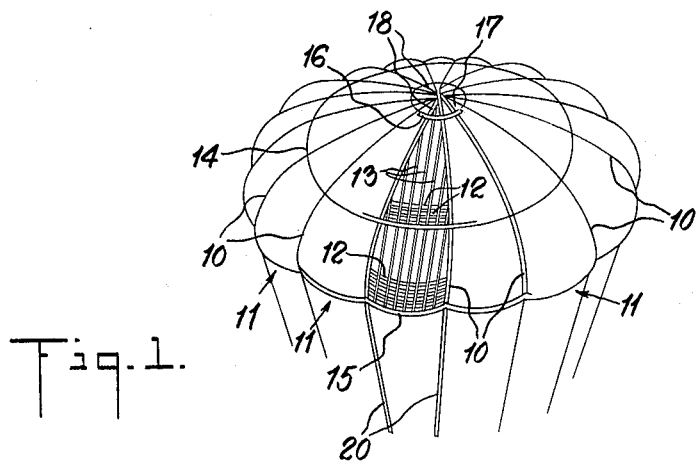
Figure 2:
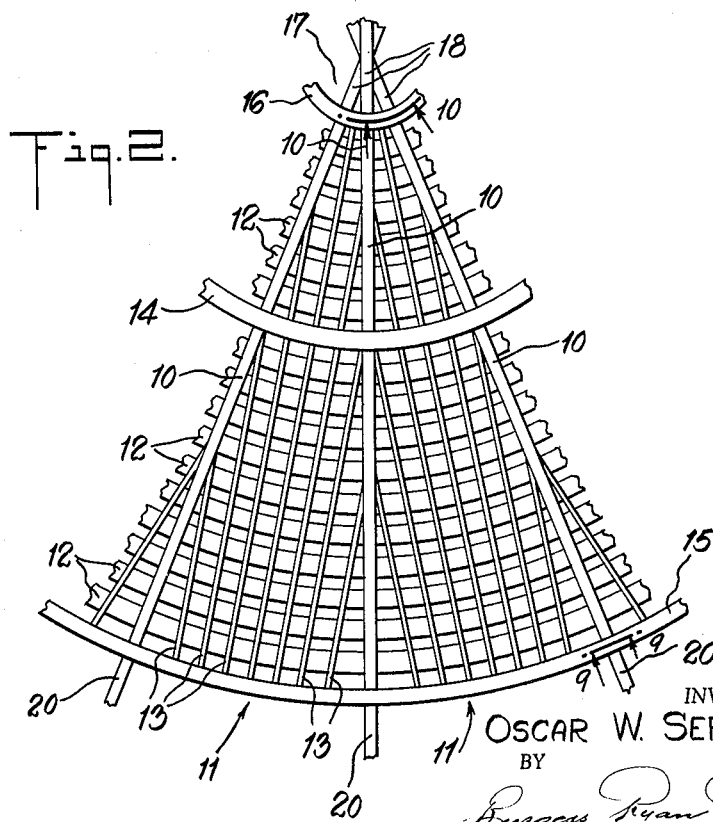
FIG. 2 is a plan view of two successive sectors of the parachute canopy of the present invention constituting one-eighth of the canopy.

Referring to the drawings, the invention is shown for purposes of illustration applied to a ribbon parachute for use in cargo descent, but it must be understood that the invention can be applied equally effectively to any type of ribbon parachute. The parachute comprises generally a series of radial ribbons 10, sixteen being shown for the purpose of illustration, equally spaced to define sixteen sectorial panels 11, as shown in FIGS. 1 and 2, a plurality of horizontal ribbons 12 extending concentrically with respect to the center of the canopy, a plurality of vertical ribbons 13 shown extending parallel in each sectorial panel, the middle vertical ribbon in each panel extending radially of the canopy, a reinforcing band 14 around the canopy, a skirt reinforcing band 15 around the canopy, a vent reinforcing band 16 around a central vent opening 17 in the canopy, vent lines 18 extending across said vent opening, and suspension lines 20 extending from the skirt of the parachute canopy. In a specific embodiment of the invention, for a canopy 11 feet in diameter, the radial ribbons 10 may, for example, be 1" wide, the horizontal ribbons 12 may be 2" wide and the vertical ribbons 13 may be ½" wide.

As an important feature of the present invention, each radial ribbon 10 is a fabric woven with slots 21 which are spaced at equal intervals along the length of the ribbon and which have a length slightly longer than the width of the horizontal ribbons 12 to permit said horizontal ribbons to be threaded easily therethrough in flat condition. The radial ribbon 10 is made of yarn of suitable strong material, such as nylon, woven into an integrated unit to form single ply sections 22 separated by double ply sections 23, each constituting two opposed plies 24 forming the corresponding slot 21, the thickness of each single ply section 22 being about twice the thickness of each of said slot forming plies 24.

The horizontal ribbons 12 are desirably of woven single ply fabric of suitable strong material, such as nylon, and each of said ribbons constitutes a single web extending around the full circumference of the canopy, the ends of this web overlapping and being secured together in any suitable manner, as for example, by stitching. These horizontal ribbons 12 are threaded through the slots 21 in the radial ribbons 10 so as to be sandwiched flat between the two plies 24 defining the slots. The resulting joints where the horizontal ribbons 12 pass through the radial ribbon 10 consists of three plies in face to face contact and these plies at all the joints along each radial ribbon 10 are firmly secured together desirably by parallel lines 26 of continuous stitching extending along the length of the radial ribbon.

The joints between the radial ribbons 10 and the horizontal ribbons 12 are not only very strong, since they are formed by continuous intersecting webbings, but are light and occupy small space because of the small number of plies required, thereby reducing the weight and volume of the canopy. Also, the simplified joint construction described permits the canopy to be manufactured comparatively cheaply and expeditiously.

As another feature of the present invention, contributing towards the increased strength of the parachute, its weight and volume and its simplicity, each radial ribbon 10 is extended at one end beyond the skirt of the canopy to form the corresponding suspension line 20 and is extended beyond the vent reinforcing band 16 and across the vent 17 to form the corresponding vent line and is continued along the canopy to the diametrically opposite side of the canopy to form the diametrically opposite radial ribbon 10 and the diametrically opposite suspension line 20. A single length of webbing can thereby serve to form two diametrically opposite radial ribbons 10, two diametrically opposite suspension lines 20 and a vent line 18 connection said radial ribbons.

The extended sections of the webbing forming the suspension lines 20 and the vent lines 18 are desirably of single ply woven construction corresponding to that of the single ply sections 22 of the radial ribbons 10 separating the slots 21 in said ribbons.

Each of the vertical ribbons 13 desirably comprises two opposed plies 30 between which the horizontal ribbons 12 pass. The horizontal ribbons 12 and the vertical ribbons 13 are secured together desirably by parallel lines of stitching 31 extending along each vertical ribbon across the horizontal ribbons.

It is important to locate the radial ribbons 10 accurately with respect to the skirt band 15 and the vent band 16. For that purpose, the skirt band 15 is a woven fabric of suitable strong material, such as nylon, constituting a single web extending around the full circumference of the canopy, the ends of this web overlapping and being secured together in any suitable manner, as for example, by stitching. This skirt band 15 is a fabric woven with slots 35 (FIGS. 8 and 9), which are spaced at equal intervals along the length of the band and which have a length longer than the width of the radial ribbons 20 to permit said radial ribbons to be threaded therethrough in flat condition. The skirt band 15 is woven into an integrated unit to form single ply sections 36 separated by double ply sections 37, each constituting two opposed plies 38 forming the corresponding slot 35, the thickness of each single ply 36 being twice the thickness of each of said slot-forming plies 38. This woven construction of the skirt band 15 is similar to that shown and described with reference to the radial ribbons 10.

Where the radial ribbon 10 passes through a corresponding slot 35 in the skirt band 15, the ribbon and the skirt band are secured firmly together by transverse stitching 40, shown following a so-called 4-point stitch pattern.

Figure 10:
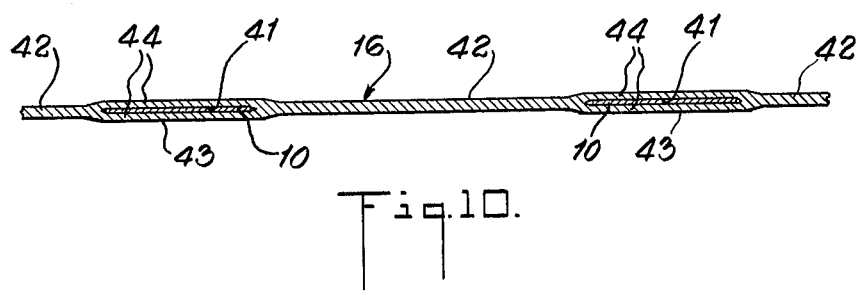
FIG. 10 is a section taken on lines 10—10 of FIG. 2, but shown on a larger scale.

The vent band 16 is similar in construction to the skirt band 15 as far as its connections to the radial ribbons 10 is concerned, and for that purpose, this band is a woven fabric of suitable strong material, such as nylon, constituting a single web extending around the full circumference of the canopy, the ends of this web overlapping and being secured together in any suitable manner, as for example, by stitching. The vent band 16 is a fabric woven with slots 41 (FIG. 10) which are spaced at equal intervals along the length of the band and which have a length slightly longer than the width of the radial ribbons 10 to permit said radial ribbons to be threaded therethrough in flat condition. The vent band 16 is woven into an integrated unit to form single ply sections 42 separated by double ply sections 43, each constituting two opposed plies 44 forming the corresponding slot 41, the thickness of each single ply section 42 being about twice the thickness of each of said slot-forming plies 44. This woven construction of the vent band 16 is similar to that shown and described with reference to the radial ribbons 10 and the skirt band 15.

Figure 8:
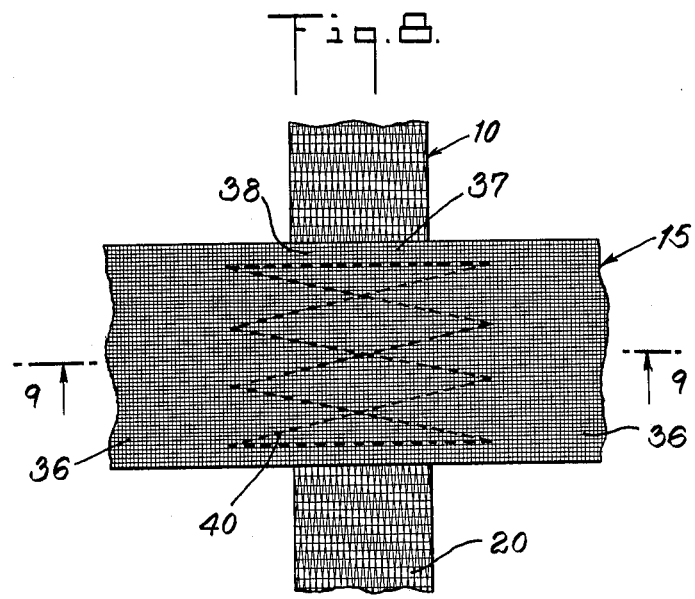
FIG. 8 is a detail plan view of part of FIG. 2 showing the juncture between a radial ribbon and the skirt band.
Figure 9:
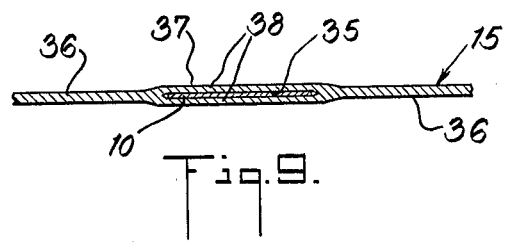
FIG. 9 is a section taken on lines 9—9 of FIG. 2 and FIG. 8.

The radial bands 10 may be secured to the vent band 16 in the regions where said ribbons pass through the slots 41 by stitching similar to the stitching 40 shown in FIG. 8, or may be secured thereto by continuing the parallel lines of stitchings 26 across the vent band.

The intermediate horizontal reinforcing band 14 is also desirably constructed in a manner similar to the skirt band 15 with a series of slots through which the radial ribbons 10 are threaded and may be secured to said radial ribbons by the parallel stitchings 26 or by transverse stitching similar to the stitching 40 shown in FIG. 8.

It is seen that with the slotted construction of the horizontal bands 14, 15 and 16, it is possible to accurately locate the radial ribbons 10 in relation thereto. At the same time, the slotted construction of the horizontal bands 14, 15 and 16 not only serves to form a strong juncture between these bands and the radial ribbons 10, but also, due to the absence of reinforcing webs, reduces the weight and volume of the canopy.

While the invention has been described with particular reference to a specific embodiment, it is to be understood that it is not to be limited thereto but is to be construed broadly and restricted solely by the scope of the appended claims.

What is claimed is:

1. A ribbon parachute comprising a canopy having a plurality of spaced radial ribbons of woven material, a plurality of horizontal ribbons intersecting said radial ribbons, and a plurality of horizontal bands, one of which constitutes a skirt band, the other constituting a vent band, said radial ribbons extending integrally outwardly beyond said skirt band and said vent band, each of said radial ribbons being formed of a webbing having sections of two plies spaced at intervals therealong to form slots at said intervals respectively between said plies, and having sections of single ply between the slotted sections of said radial ribbons, the two plies of the slotted sections being integrally woven together at their ends and blended into the single ply sections, said horizontal ribbons being threaded through said slots in flat face to face contact with the two plies of the radial ribbons defining said slots, each of said bands being formed of a webbing having sections of two plies spaced at intervals therealong to form slots at the latter intervals respectively between the two plies of the band and having sections of single ply between the slotted sections of the band, the two plies of the slotted sections of the band being integrally woven together at their ends and blended into the single ply sections of the band, said radial ribbons being threaded through the slots in said bands in flat face to face contact with the two plies of the bands defining the slots in the bands.

2. A ribbon parachute comprising a canopy having a plurality of spaced radial ribbons of woven material and a plurality of horizontal ribbons intersecting said radial ribbons, each of said radial ribbons being formed of a webbing having sections of two plies spaced at intervals therealong to form slots at said intervals respectively between said plies, and having sections of single ply between the slotted sections, the two plies of the slotted sections being integrally woven together at their ends and blended into the single ply sections, said horizontal ribbons being threaded through said slots in flat face to face contact with the two plies of the radial ribbons defining said slots.

3. A ribbon parachute as described in claim 2, wherein said horizontal ribbons are further secured to said radial ribbons by stitching in the slotted sections of said radial ribbons.

4. A ribbon parachute as described in claim 2, wherein said horizontal ribbons are secured to each radial ribbon by a plurality of lines of stitching extending along the length of the radial ribbons including the slotted sections.

5. A ribbon parachute as described in claim 2, said canopy having a skirt band, and said radial ribbons extending integrally beyond said skirt band to form the suspension lines of the parachute.

6. A ribbon parachute as described in claim 2, said canopy having a vent opening at the top, and said radial ribbons extending across said opening to form the vent lines of the canopy.

7. A ribbon parachute as decribed in claim 2, each of said horizontal ribbons consisting of a single continuous piece of ribbon extending around the entire circumference of the parachute and having its ends secured together.

8. A ribbon parachute comprising a canopy having a plurality of spaced radial ribbons of woven material, a plurality of vertical ribbons, and a plurality of horizontal ribbons intersecting said radial ribbons, each of said vertical ribbons comprising two opposed plies between which the horizontal ribbons pass in face to face contact with said plies and stitched to said horizontal ribbons, each of said radial ribbons being formed of a webbing having sections of two plies spaced at intervals therealong to form slots at said intervals respectively between said plies, and having sections of single ply between the slotted sections, the two plies of the slotted sections being integrally woven together at their ends and blended into the single ply sections of the radial ribbon, said horizontal ribbons being threaded through said slots, the sections of said horizontal ribbons passing through said slots being of single ply and in face to face contact with the two plies of the radial ribbons defining said slots.

9. A ribbon parachute as described in claim 2, wherein the thickness of each ply in the slotted sections of the radial ribbons is less than the thickness of the single ply sections of the radial ribbons between adjacent horizontal ribbons.

10. A ribbon parachute comprising a canopy having a plurality of spaced radial ribbons of woven material and a plurality of horizontal ribbons intersecting said radial ribbons, each of said radial ribbons being formed of a webbing having sections of two plies spaced at intervals therealong to form slots at said intervals respectively between said plies, and single ply sections between the slotted sections, said horizontal ribbons being threaded through said slots in face to face contact with the two plies of the radial ribbons defining said slots, said radial ribbons being so integrally woven that the single ply sections of the radial ribbon are approximately twice the thickness of the individual plies in the slotted sections of the radial ribbon overlying the faces of the horizontal ribbons.

11. A ribbon parachute comprising a canopy having a plurality of spaced radial ribbons, a plurality of horizontal ribbons intersecting said radial ribbons, means connecting said horizontal ribbons to said radial ribbons at their intersections, and a horizontal skirt band, said radial ribbons extending integrally outwardly beyond said skirt band to form the suspension lines of the parachute, said band being formed of a webbing having sections of two plies spaced at intervals therealong to form slots at said intervals respectively between the two plies and having sections of single ply between the slotted sections, the two plies of the slotted sections being integrally woven together at their ends and blended into the single ply sections, said radial ribbons being threaded through said slots in face to face contact with the two plies of the band defining said slots.

12. A ribbon parachute comprising a canopy having a plurality of spaced radial ribbons, a plurality of horizontal ribbons intersecting said radial ribbons, means connecting said horizontal ribbons to said radial ribbons at their intersections, and a horizontal vent band, said radial ribbons extending integrally outwardly beyond said vent band to form vent lines, said band being formed of a webbing having sections of two plies spaced at intervals therealong to form slots at said intervals respectively between the two plies and having sections of single ply between the slotted sections, the two plies of the slotted sections being integrally woven together at their ends and blended into the single ply sections, said radial ribbons being threaded through said slots in face to face contact with the two plies of the band defining said slots.

References Cited by the Examiner

UNITED STATES PATENTS

| 3,011,742 | 12/1961 | Gross | 244—145 X |
| 3,041,022 | 6/1962 | Sepp | 244—152 |
| 3,127,137 | 3/1964 | Downing | 244—145 |

FOREIGN PATENTS 826,183  12/1951  Germany.

MILTON BUCHLER, *Primary Examiner.*